(12) United States Patent
Yang et al.

(10) Patent No.: US 10,904,871 B2
(45) Date of Patent: Jan. 26, 2021

(54) AGGREGATION LEVEL SPECIFIC PDCCH MODIFICATION

(71) Applicant: QUALCOMM Incorporated, San Diego, CA (US)

(72) Inventors: Yang Yang, San Diego, CA (US); Jing Jiang, San Diego, CA (US); Jing Sun, San Diego, CA (US); Tao Luo, San Diego, CA (US); Peter Gaal, San Diego, CA (US); Gabi Sarkis, San Diego, CA (US); Joseph Binamira Soriaga, San Diego, CA (US); Heechoon Lee, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 16/201,844

(22) Filed: Nov. 27, 2018

(65) Prior Publication Data
US 2019/0166589 A1  May 30, 2019

Related U.S. Application Data

(60) Provisional application No. 62/616,652, filed on Jan. 12, 2018, provisional application No. 62/617,155, (Continued)

(51) Int. Cl.
*H04L 1/00* (2006.01)
*H04W 72/04* (2009.01)
(Continued)

(52) U.S. Cl.
CPC ........... *H04W 72/042* (2013.01); *H04L 1/004* (2013.01); *H04L 1/0061* (2013.01);
(Continued)

(58) Field of Classification Search
None
See application file for complete search history.

(56) References Cited

U.S. PATENT DOCUMENTS

2010/0316146 A1* 12/2010 McBeath .............. H04L 5/0053
375/260
2011/0286413 A1* 11/2011 Nishio ................. H04J 11/0073
370/329
(Continued)

FOREIGN PATENT DOCUMENTS

EP  3226434 A1  10/2017
WO  WO-2014064591 A1 *  5/2014 ............. A23G 9/327

OTHER PUBLICATIONS

Ericsson, et al: "On Resolving ePDCCH Aggregation Level Ambiguity," 3GPP Draft; R1-124159, 3rd Generation Partnership Project (3GPP), Mobile Competence Centre; 650, Route Des Lucioles; F-06921 Sophia-Antipolis Cedex; France, vol. RAN WG1, No. San Diego, USA; Oct. 8, 2012-Oct. 12, 2012, Sep. 29, 2012, XP050662068, 2 pages, Retrieved from the Internet: URL: http://www.3gpp.org/ftp/tsg_ran/WG1_RL1/TSGR1_70b/Docs/ [retrieved on Sep. 29, 2012].

(Continued)

*Primary Examiner* — Kodzovi Acolatse
*Assistant Examiner* — The Hy Nguyen
(74) *Attorney, Agent, or Firm* — Patterson & Sheridan, L.L.P.

(57) ABSTRACT

Certain aspects of the present disclosure relate to methods and apparatus for aggregation level specific PDCCH modification.

8 Claims, 17 Drawing Sheets

Related U.S. Application Data filed on Jan. 12, 2018, provisional application No. 62/592,356, filed on Nov. 29, 2017.

(51) Int. Cl.
  *H04W 72/14* (2009.01)
  *H04L 5/00* (2006.01)
(52) U.S. Cl.
  CPC .......... *H04L 1/0072* (2013.01); *H04L 5/0048* (2013.01); *H04L 5/0053* (2013.01); *H04W 72/0446* (2013.01); *H04W 72/14* (2013.01); *H04L 1/00* (2013.01); *H04L 5/0055* (2013.01)

(56) References Cited

U.S. PATENT DOCUMENTS

| | | | | |
|---|---|---|---|---|
| 2012/0051270 A1* | 3/2012 | Chen | .................... | H04L 5/0091 370/279 |
| 2012/0320782 A1* | 12/2012 | Seo | .................... | H04B 7/15542 370/252 |
| 2014/0078978 A1* | 3/2014 | Cheng | .................... | H04L 1/0041 370/329 |
| 2014/0092830 A1* | 4/2014 | Chen | .................... | H04W 72/042 370/329 |
| 2014/0334397 A1* | 11/2014 | Chen | .................... | H04L 5/0044 370/329 |
| 2018/0324841 A1* | 11/2018 | Horiuchi | ............... | H04W 72/12 |

OTHER PUBLICATIONS

Intel Corporation: "Blind Decoding Ambiguity Resolution," 3GPP Draft; R1-124731 Blind Decoding Ambiguity_V12, 3rd Generation Partnership Project (3GPP), Mobile Competence Centre; 650, Route Des Lucioles; F-06921 Sophia-Antipolis Cedex; France, vol. RAN WG1, No. New Orleans, USA; Nov. 12, 2012-Nov. 16, 2012, Nov. 2, 2012, XP050662596, 5 pages, Retrieved from the Internet: URL: http://www.3gpp.org/ftp/tsg_ran/WG1_RL1/TSGR1_71/Docs/ [retrieved on Nov. 2, 2012].
International Search Report and Written Opinion—PCT/US2018/062805—ISA/EPO—dated Feb. 13, 2019.

\* cited by examiner

AGGREGATION LEVEL SPECIFIC PDCCH MODIFICATION

CLAIM OF PRIORITY UNDER 35 U.S.C. § 119

This application claims the benefit of U.S. Provisional Patent Application Ser. No. 62/592,356, filed Nov. 29, 2017, U.S. Provisional Patent Application Ser. No. 62/616,652, filed Jan. 12, 2018, and U.S. Provisional Patent Application Ser. No. 62/617,155, filed Jan. 12, 2018, which are herein incorporated by reference in their entirety.

FIELD

The present disclosure relates generally to communication systems, and more particularly, to methods and apparatus for modifying control information based on an aggregation level.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a base station (BS). The method generally includes generating coded bits for a physical downlink control channel (PDCCH) message for transmission at a first aggregation level, wherein the coded bits of the PDCCH message are generated in an aggregation level specific manner; and transmitting the PDCCH message to a user equipment (UE) using a decoding candidate for the first aggregation level comprising time and frequency resources that overlap with time and frequency resources of a decoding candidate for a second aggregation level.

Certain aspects provide a method for wireless communication by a user equipment (UE). The method generally includes receiving a physical downlink control channel (PDCCH) message transmitted using a decoding candidate for a first aggregation level comprising time and frequency resources that overlap with time and frequency resources of a decoding candidate for a second aggregation level; and decoding the PDCCH message in an aggregation level specific manner to confirm whether the PDCCH message was transmitted using the first or second aggregation level.

Certain aspects provide a method for wireless communication by a base station (BS). The method generally includes generating coded bits for a physical downlink control channel (PDCCH) message for transmission at a first aggregation level; and transmitting the PDCCH message to a user equipment (UE) using a decoding candidate from a first search space for the first aggregation level comprising time and frequency resources that overlap with time and frequency resources of a decoding candidate from a second search space for a second aggregation level, wherein decoding candidates of the first and second search spaces are designed to ensure there is no ambiguity regarding what aggregation level has been used for a corresponding PDCCH transmission.

Certain aspects provide a method for wireless communication by a user equipment (UE). The method generally includes identifying decoding candidates from a first search space for a first aggregation level and a second search space for a second aggregation level, wherein decoding candidates of the first and second search spaces are designed to ensure there is no ambiguity regarding what aggregation level has been used for a corresponding PDCCH transmission; and monitoring for a PDCCH message transmitted using a decoding candidate from at least one of the first or second search spaces.

Certain aspects provide a method for wireless communication by a base station (BS). The method generally includes generating coded bits for a physical downlink control channel (PDCCH) message, wherein the PDCCH message includes at least a downlink control information (DCI) payload and cyclic redundancy check (CRC) bits, determining whether an ambiguity condition is present for a user equipment (UE) attempting to decode the PDCCH message based on an aggregation level used for the PDCCH message, modifying an attribute associated with at least one of the DCI payload, the PDCCH, or a physical downlink shared channel (PDSCH) based on the determination that the ambiguity condition is present, mapping the coded bits to control channel elements (CCEs) based at least in part on the aggregation level, and transmitting the PDCCH message.

Certain aspects provide a method for wireless communication by a user equipment (UE). The method generally includes receiving a physical downlink control channel (PDCCH) message, wherein the PDCCH message spans a number control channel elements (CCEs), wherein the number of CCEs is based on an aggregation level associated with the message, wherein the PDCCH message includes at least a downlink control information (DCI) payload and cyclic redundancy check (CRC) bits, determining an aggregation level for the PDCCH message to use for decoding a physical downlink shared channel (PDSCH) message in the event of an ambiguity condition regarding the aggregation level for the PDCCH message, and decoding the PDSCH message in accordance with the determined aggregation level.

Certain aspects provide a method for wireless communication by a base station (BS). The method generally includes generating coded bits for a physical downlink control channel (PDCCH) message. The PDCCH message may include a payload and cyclic redundancy check (CRC) bits. The method further includes masking the CRC bits with at least a Radio Network Temporary Identifier (RNTI) associated with a user equipment (UE), modifying at least one of the payload, the CRC bits, or the RNTI, or any combination thereof, based on an aggregation level, mapping the coded bits to control channel elements (CCEs) based at least in part on the aggregation level, and transmitting the PDCCH message.

Certain aspects provide a method for wireless communication by a user equipment (UE). The method generally includes receiving a physical downlink control channel (PDCCH) message transmitted using a decoding candidate for a first aggregation level comprising time and frequency resources that overlap with time and frequency resources of a decoding candidate for a second aggregation level; and decoding the PDCCH message in an aggregation level specific manner to confirm whether the PDCCH message was transmitted using the first or second aggregation level.

Certain aspects provide a method for wireless communication by a base station (BS). The method generally includes receiving a message on a PDCCH. The message may span a number CCEs, the number of CCEs may be based on an aggregation level associated with the message, and the message may include at least a payload and CRC bits. Further, the CRC bits may have been masked using at least a RNTI associated with the UE. The method may further include deriving the aggregation level of the message based at least in part on an attribute associated with the aggregation level. The attribute may be associated with the aggregation level used to modify at least one of the payload, the CRC bits, or the RNTI. Still further, the method may include determining the number of CCEs that the message spans, and decoding the message.

Aspects generally include methods, apparatus, systems, computer readable mediums, and processing systems, as substantially described herein with reference to and as illustrated by the accompanying drawings.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

Figure 1:
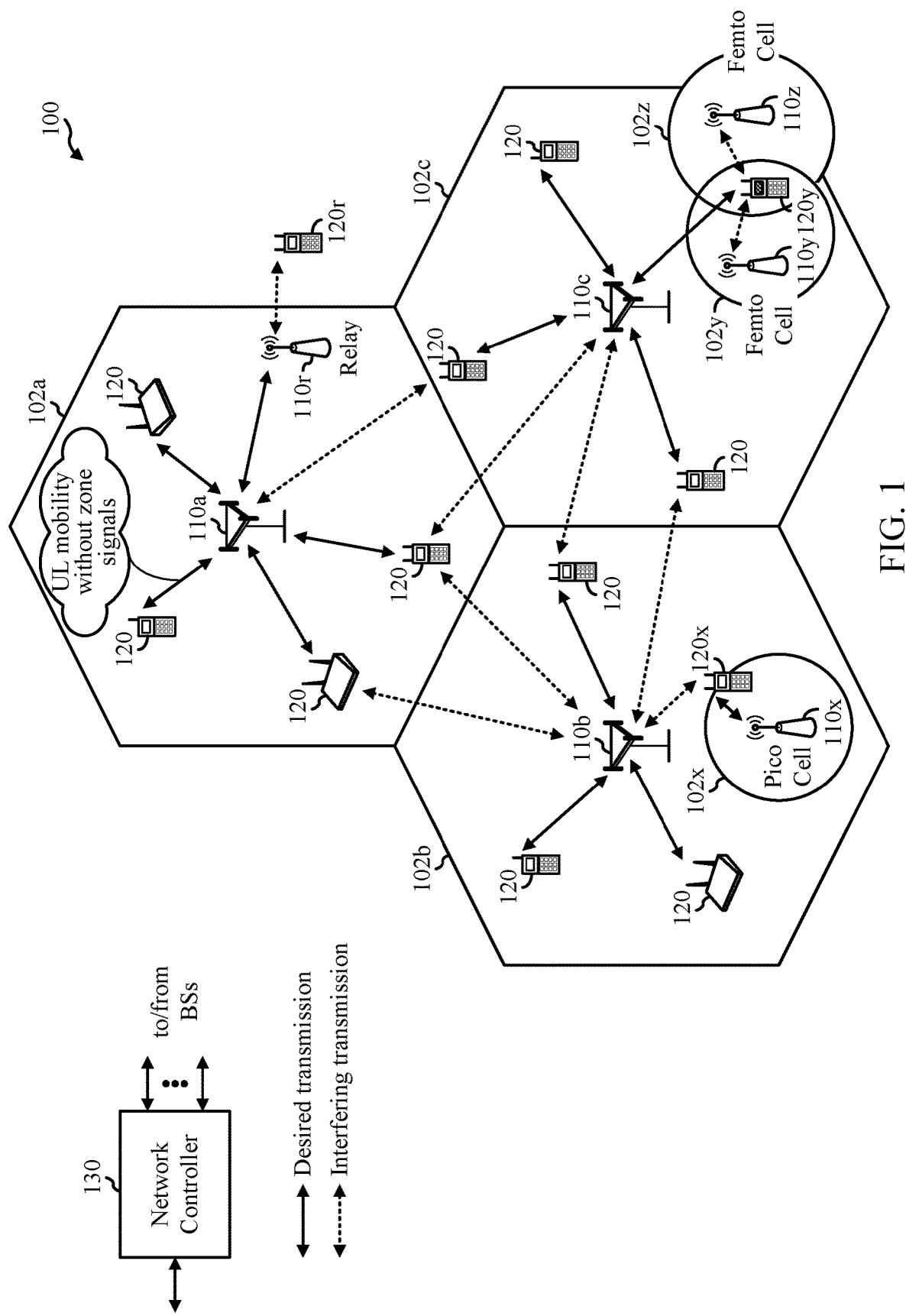
FIG. 1 is a block diagram conceptually illustrating an example telecommunications system, in accordance with certain aspects of the present disclosure.

To facilitate understanding, identical reference numerals have been used, where possible, to designate identical elements that are common to the figures. It is contemplated that elements described in one aspect may be beneficially utilized on other aspects without specific recitation. Aspects generally include methods, apparatus, systems, computer program products, computer-readable medium, and processing systems, as substantially described herein with reference to and as illustrated by the accompanying drawings.

DETAILED DESCRIPTION

Aspects of the present disclosure provide apparatus, methods, processing systems, and computer readable mediums for NR (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

In some systems, such as NR, there may be situations in which a higher aggregation level control message (e.g., NR physical downlink control channel (PDCCH) message) can be decoded (e.g., by a UE) as a lower aggregation level control message. However, as described in more detail below, such situations may present issues when the UE attempts to determine information that is based in part on the resources used for the NR-PDCCH message.

In one reference example, if a particular control channel element (CCE) location (e.g., last CCE index) of the NR-PDCCH message is associated with the physical uplink control channel (PUCCH) allocation, the UE may not be able to reliably determine the PUCCH allocation in cases where the UE decodes the higher AL control message (e.g., AL-16 NR-PDCCH) in a subset of the CCEs used for the higher AL control message. In another reference example, if the control resource set (coreset) is being reused by PDSCH, the UE may not be able to know the exact PDCCH CCE usage, e.g., in order to rate match PDSCH around the used CCEs.

Accordingly, aspects provide techniques and apparatus for resolving potential ambiguities that may arise in situations where a higher AL control message is decodable as a lower AL control message.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc.

Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells may be configured as access cell (ACells) or data only cells (DCells). For example, the RAN (e.g., a central unit or distributed unit) may configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
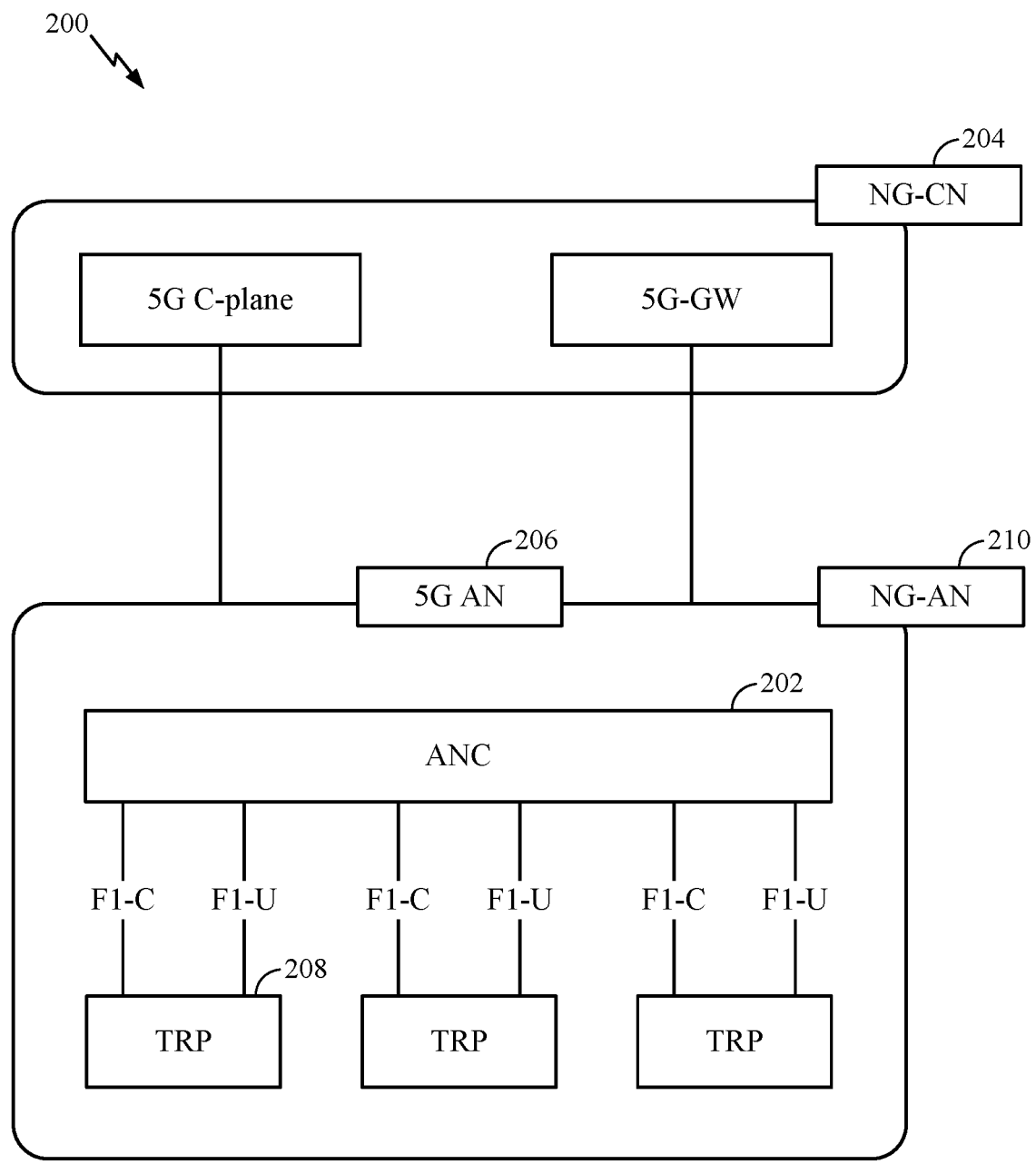
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
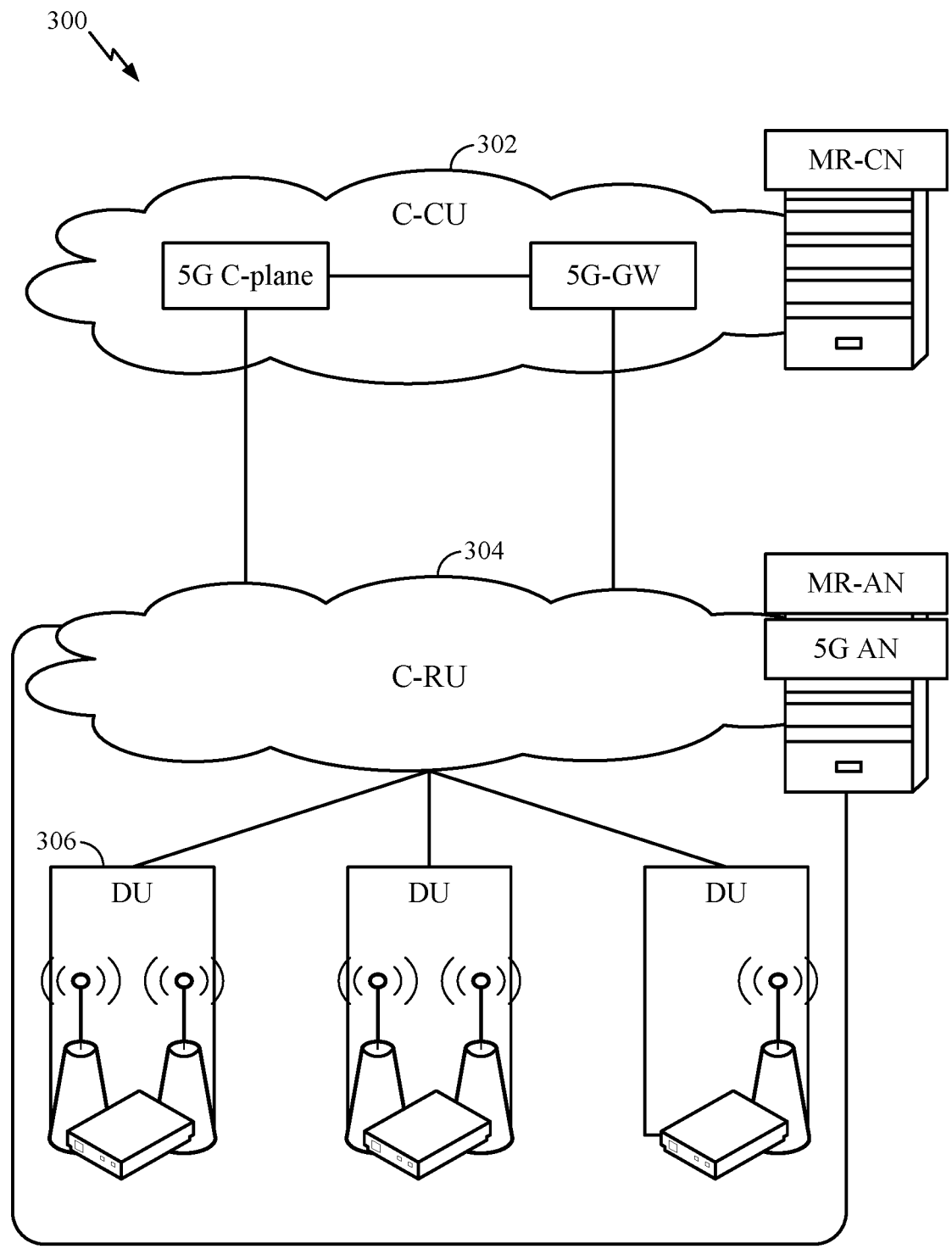
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
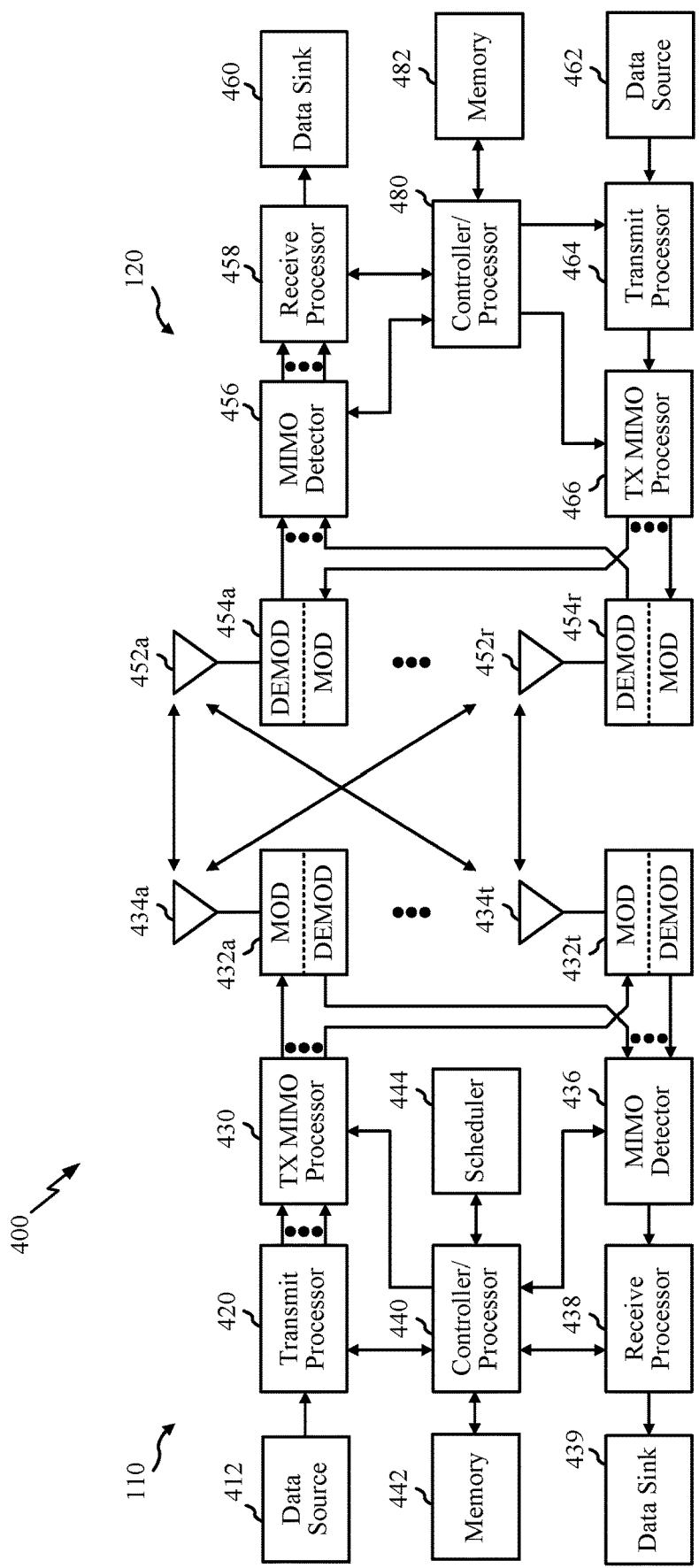
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 9-12.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects may include providing the antennas, as well as some Tx/Rx functionalities, such that they reside in distributed units. For example, some Tx/Rx processings may be done in the central unit, while other processing may be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIGS. 9 and 11 and/or other processes for the techniques described herein. The processor 480 and/or other processors and modules at the UE 120 may also perform or direct, e.g., the execution of the functional blocks illustrated in FIGS. 10 and 12 and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
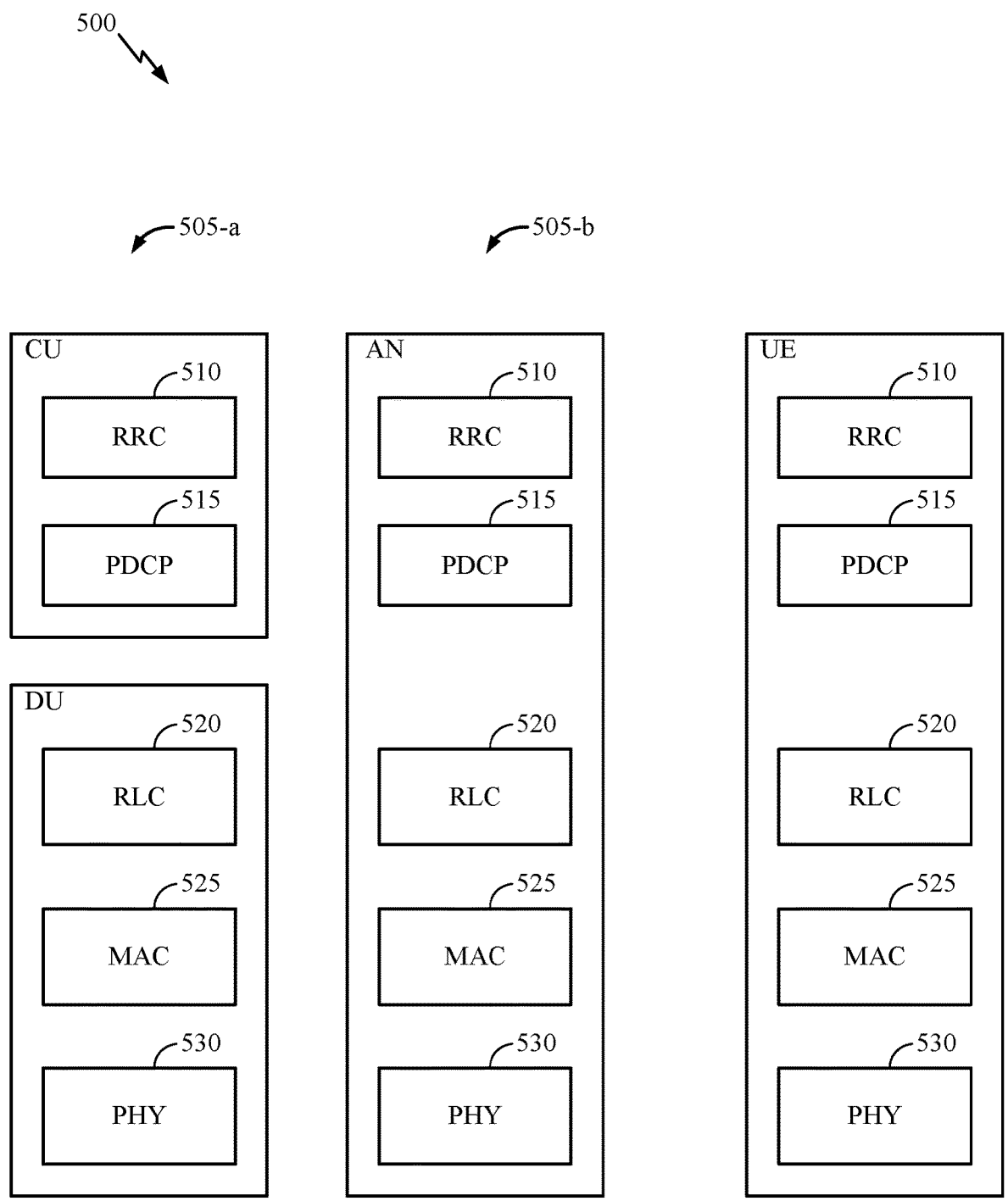
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
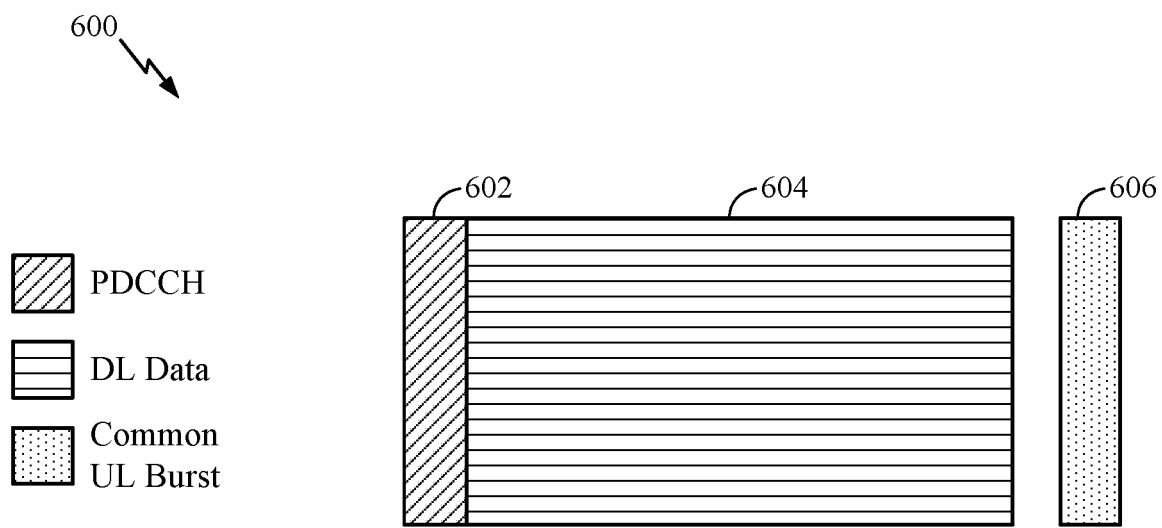
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
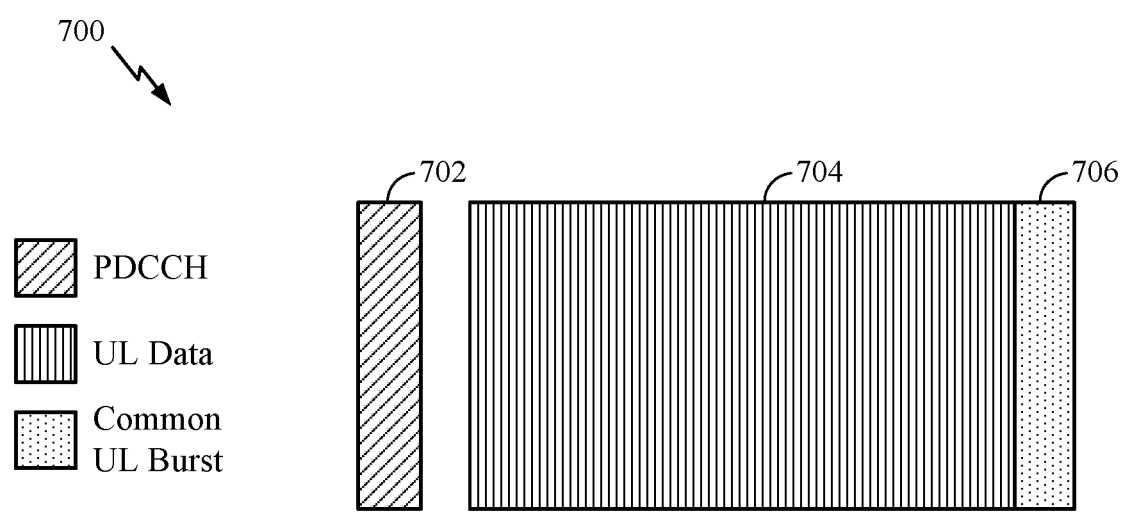
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion 602 described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In communication systems operating according to new radio (NR) (e.g., 5G) standards, one or more control resource sets (coresets) for transmission of PDCCHs may be supported. A coreset may include one or more control resources (e.g., time and frequency resources) configured for conveying PDCCH. Within each corset, one or more search spaces (e.g., common search space, UE-specific search space, etc.) may be defined for a given UE. A coreset may be defined in units of resource element groups (REGs). Each REG may include a fixed number (e.g., twelve, or some other number) of tones in one symbol period (e.g., a symbol period of a slot), where one tone in one symbol period is referred to as a resource element (RE). A fixed number of REGs may be included in a control channel element (CCE) (e.g., a CCE may include six REGs, or some other number of REGs).

A NR-PDCCH may occupy one or more NR-CCEs. For NR-PDCCH, different numbers of NR-CCEs may form the resource for downlink control information (DCI). The number of NR-CCEs in a NR-PDCCH generally refers to the NR-PDCCH's aggregation level. The aggregation level generally configures the coverage of DCI and the amount of resource used for the DCI. Multiple sets of NR-CCEs may be defined as search spaces for UEs. For example, for NR-PDCCH, one or more search spaces may be defined, where each search space includes a set of decoding candidates with one or more aggregation levels. Thus, a gNB may transmit a NR-PDCCH to a UE by transmitting the NR-PDCCH in a set of CCEs that is defined as a decoding candidate within a search space for the UE. Likewise, the UE may receive the NR-PDCCH by searching in search spaces for the UE and decoding the NR-PDCCH transmitted by the gNB.

Example Aggregation Level Specific PDCCH Modification

In some communication systems, e.g., such as NR, there may be situations in which a higher aggregation level control message can be decoded by the UE as a lower aggregation level control message.

Figure 8:
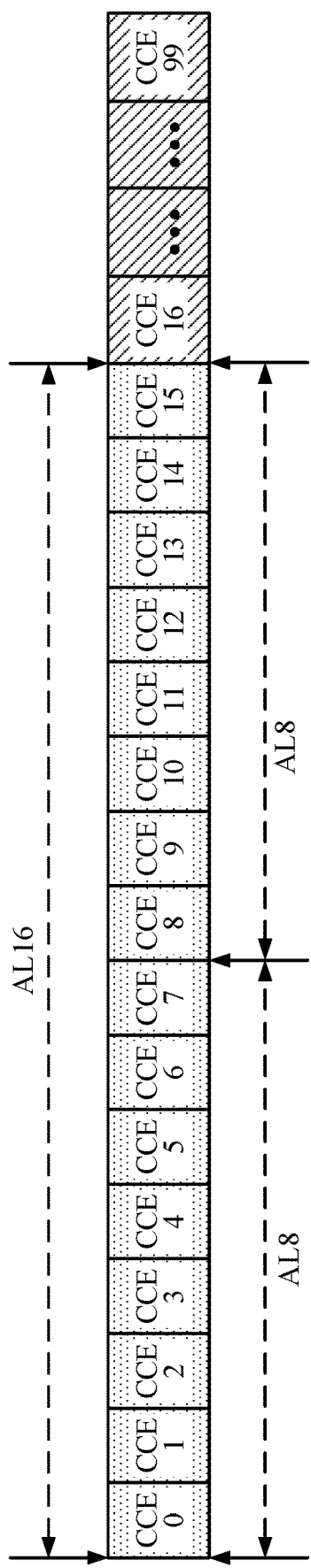
FIG. 8 illustrates example decoding candidates for different aggregation levels, in accordance with certain aspects of the present disclosure.

FIG. 8, for example, illustrates a scenario in which a higher aggregation level control message can be decoded by the UE as a lower aggregation level control message. In this example, decoding candidates for AL-16 may include CCEs 0-15 (e.g., first decoding candidate), CCEs 16-30 (e.g., second decoding candidate), and so on. Decoding candidates for AL-8 may include CCEs 0-7 (e.g., first decoding candidate), CCEs 8-15 (e.g., second decoding candidate), and so on.

In this scenario, assume that a NR-PDCCH is transmitted with AL-16 and occupies 16 NR-CCEs. If the first 8 CCEs of the 16 CCEs constitute a valid search location (e.g., decoding candidate) for AL-8, then there may be situations (e.g., in good channel conditions) where the UE is able to decode the NR-PDCCH using the first 8 CCEs of the 16 CCEs. From the UE perspective, the UE may not be able to determine whether the NR-PDCCH is transmitted with AL-8 or AL-16. This ambiguity may present issues in cases where the UE has to determine information (e.g., resource allocations) based in part on resources used for the NR-PDCCH message.

In some cases, for example, the UE may determine (e.g., derive) the PUCCH resource allocation for transmitting ACK/NACK feedback for the NR-PDCCH, based in part on the first CCE index or last CCE index used for the NR-PDCCH. However, with reference to FIG. 8, if the PUCCH resource allocation is associated with the last CCE index of an AL-16 NR-PDCCH, and the UE decodes the NR-PDCCH in the first 8 CCEs of the 16 CCEs, then the UE may not be able to accurately determine the PUCCH allocation to use for the ACK/NACK feedback.

In general, if the UE decodes PDCCH based on the wrong aggregation level, and if a corresponding PDSCH transmission is rate matched around PDCCH, the UE may look for PDSCH in the wrong location (within time/frequency resources).

Additionally, or alternatively, in some cases, if the coreset is being reused by PDSCH, then the UE may have to know the exact PDCCH CCE usage to figure out how to rate match PDSCH around the used CCEs.

Techniques presented herein, however, may allow a base station and UE to resolve ambiguity regarding PDCCH aggregation level and, as a result, may help a UE properly decode PDSCH (e.g., by knowing what PDCCH CCEs to rate match around).

Note that while FIG. 8 uses AL-16 as an example of a higher level AL and AL-8 as an example of a lower level AL, the techniques presented herein can be applied to other ALs. For example, the techniques presented herein can be applied in situations in which an AL-8 control message is decodable as an AL-4 control message, etc.

Aspects presented herein provide techniques and apparatus for resolving issues that may arise when a higher AL NR-PDCCH message can be decoded as a lower AL NR-PDCCH message.

According to certain aspects, the base station (e.g., gNB) may be configured to make aggregation level specific modifications to the NR-PDCCH message, to attributes associated with the NR-PDCCH message (e.g., before the coded bits are mapped to the CCEs), to a corresponding NR-PDSCH, and/or attributes associated with the NR-PDSCH, to prevent an ambiguity between the UE and base station regarding what AL has been used to convey the control message.

Figure 9:
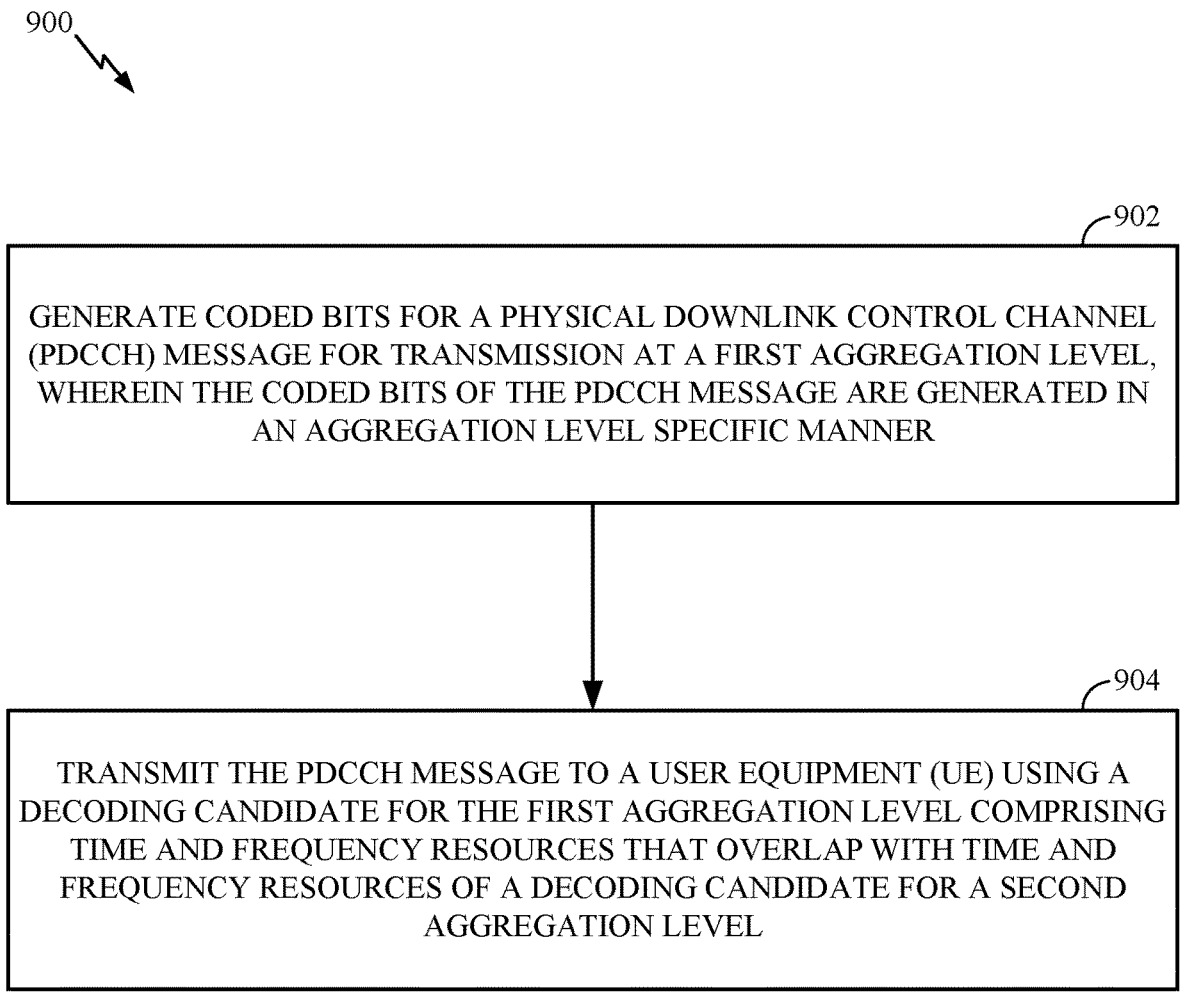
FIG. 9 illustrates example operations for wireless communications performed by a base station, in accordance with certain aspects of the present disclosure.

FIG. 9 illustrates example operations 900 for wireless communications, in accordance with aspects of the present disclosure. Operations 900 may be performed, for example, by a base station (e.g., a gNB), such as BS 110 shown in FIG. 1. Operations 900 begin, at 902, where the base station generates coded bits for a PDCCH (e.g., NR-PDCCH) message for transmission at a first aggregation level (e.g., AL-16). The coded bits of the PDCCH message are generated in an aggregation level specific manner. In one aspect, the base station may generate the coded bits in an aggregation level specific manner by modifying one or more of the coded bits in an aggregation level specific manner before mapping the coded bits to CCEs of the decoding candidate for the first aggregation level.

At 904, the base station transmits the PDCCH message to a UE using a decoding candidate for the first aggregation level including time and frequency resources that overlap with time and frequency resources of a decoding candidate for a second aggregation level (e.g., AL-8).

Figure 10:
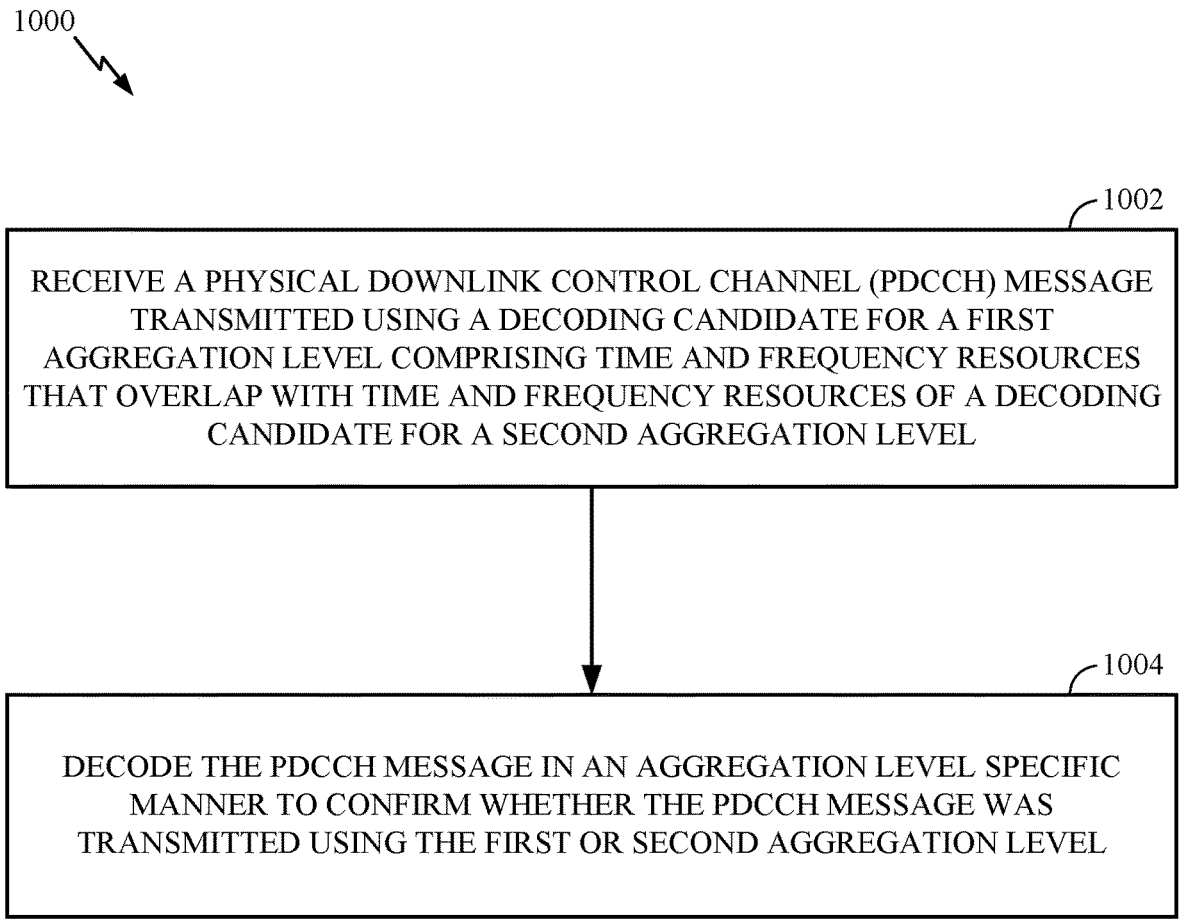
FIG. 10 illustrates example operations for wireless communications performed by a user equipment, in accordance with certain aspects of the present disclosure.

FIG. 10 illustrates example operations 1000 for wireless communications, in accordance with aspects of the present disclosure. Operations 1000 may be performed, for example, by a user equipment (e.g., UE), such as UE 120 shown in FIG. 1.

Operations 1000 begin, at 1002, where the UE receives a PDCCH message (e.g., NR-PDCCH) message transmitted using a decoding candidate for a first aggregation level (e.g., AL-16) including time and frequency resources that overlap with time and frequency resources of a decoding candidate for a second aggregation level (e.g., AL-8).

At 1004, the UE decodes the PDCCH message in an aggregation level specific manner to confirm whether the PDCCH message was transmitted using the first or second aggregation level. In one aspect, decoding the PDCCH in an aggregation level specific manner may include modifying one or more of the decoded bits in an aggregation level specific manner after de-mapping the coded bits from CCEs of the decoding candidate for the first aggregation level.

In some cases, the UE may decode a physical downlink shared channel (PDSCH) message (scheduled by the PDCCH) based on a selected one of the first or second aggregation level. For example, decoding the PDSCH message may include rate matching around CCEs used for PDCCH based on the selected aggregation level.

As noted above, an ambiguity in PDCCH aggregation level may prevent a UE from knowing what CCEs are used for PDCCH (and should be rate matched around). Using a predefined aggregation level (e.g., AL16) as proposed herein, however, may allow the UE (and base station) to rate match PDSCH around the proper CCEs used for PDCCH.

In some aspects, the base station may modify the coded bits in an aggregation level specific manner by cyclically rotating the coded bits before mapping the coded bits to CCEs of the decoding candidate for the first aggregation level, where an amount of the cyclic rotation is dependent on the first aggregation level. Similarly, in some aspects, the UE may modify one or more of the decoded bits in an aggregation level specific manner by cyclically rotating (e.g., in reverse) the decoded bits, where an amount of the cyclic rotation is dependent on the first aggregation level.

In some aspects, the base station may modify the coded bits in an aggregation level specific manner by inverting one or more of the coded bits, depending on the first aggregation level. For example, the base station may invert the bits from 0 to 1 and from 1 to 0 based on the aggregation level. Similarly, the UE may modify one or more of the decoded bits in an aggregation level specific manner by inverting one or more of the decoded bits, depending of the first aggregation level.

In general, the base station may perform any modification (e.g., scrambling, rotation, or any other lossless transformation) as a function of aggregation level. For example, the base station may modify the coded bits in an aggregation level specific manner by at least one of scrambling or interleaving one or more of the coded bits, depending on the first aggregation level. Similarly, the UE may modify one or more of the decoded bits in an aggregation level specific manner by at least one of de-scrambling or de-interleaving one or more of the coded bits, depending on the first aggregation level.

In some aspects, the base station may modify one or more of the coded bits in an aggregation level specific manner only for aggregation levels above a threshold level. For example, the base station may modify the coded bits for only AL8 and beyond. Similarly, the UE may modify one or more of the decoded bits in an aggregation level specific manner only for aggregation levels above a threshold level.

According to certain aspects, the gNB may be configured to prevent situations that lead to ambiguities regarding what aggregation level has been used for a corresponding NR-PDCCH transmission.

Figure 11:
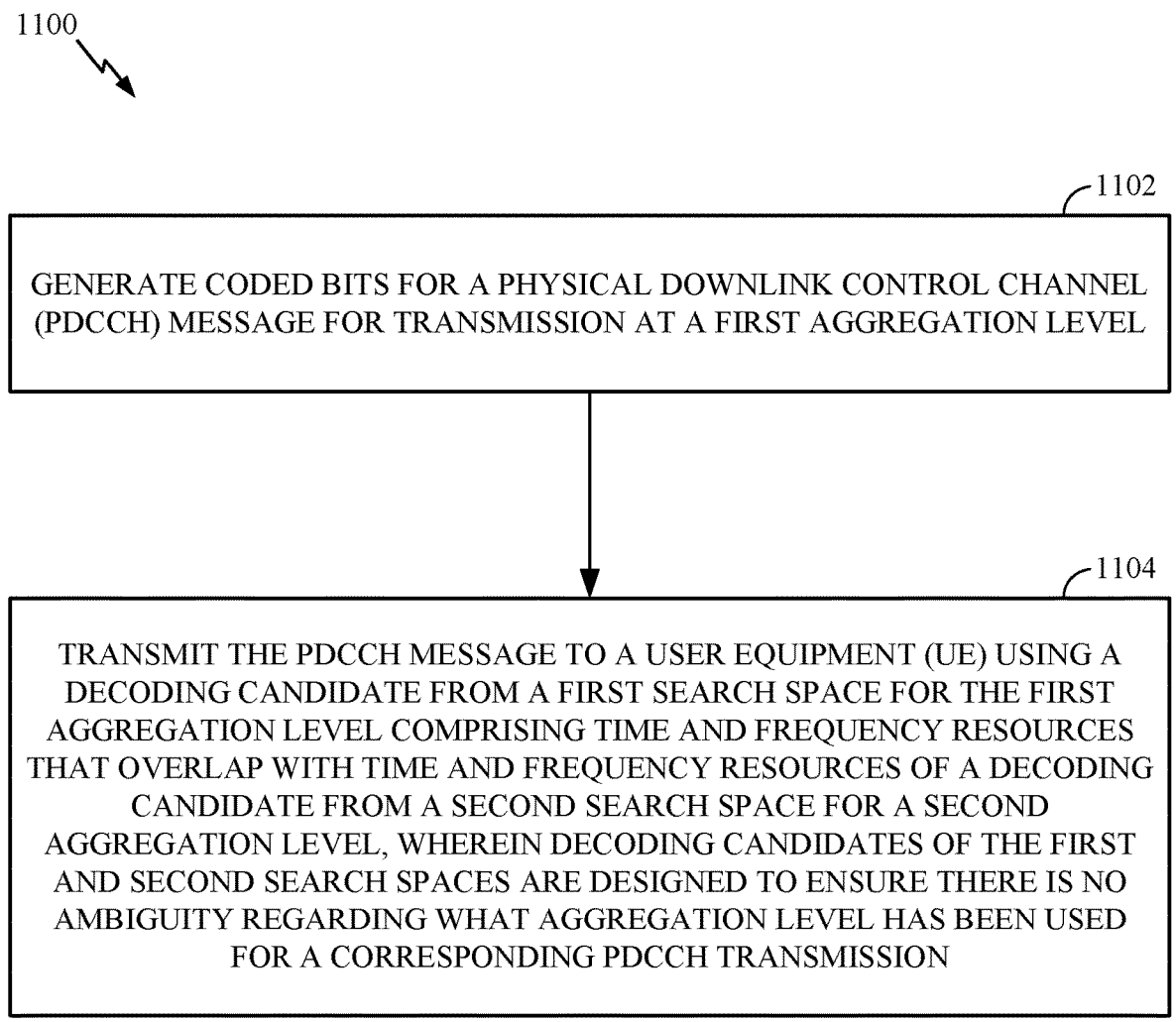
FIG. 11 illustrates example operations for wireless communications performed by a base station, in accordance with certain aspects of the present disclosure.

FIG. 11 illustrates example operations 1100 for wireless communications, in accordance with aspects of the present disclosure. Operations 1100 may be performed, for example, by a base station (e.g., a gNB), such as BS 110 shown in FIG. 1.

Operations 1100 begin, at 1102, where the base station generates coded bits for a PDCCH message (e.g., NR-PDCCH message) for transmission at a first aggregation level (e.g., AL-16). At 1104, the base station transmits the PDCCH message to a UE using a decoding candidate from a first search space for the first aggregation level comprising time and frequency resources that overlap with time and frequency resources of a decoding candidate from a second search space for a second aggregation level (e.g., AL-8). The decoding candidates of the first and second search spaces are designed to ensure there is no ambiguity regarding what aggregation level has been used for a corresponding PDCCH transmission.

Figure 12:
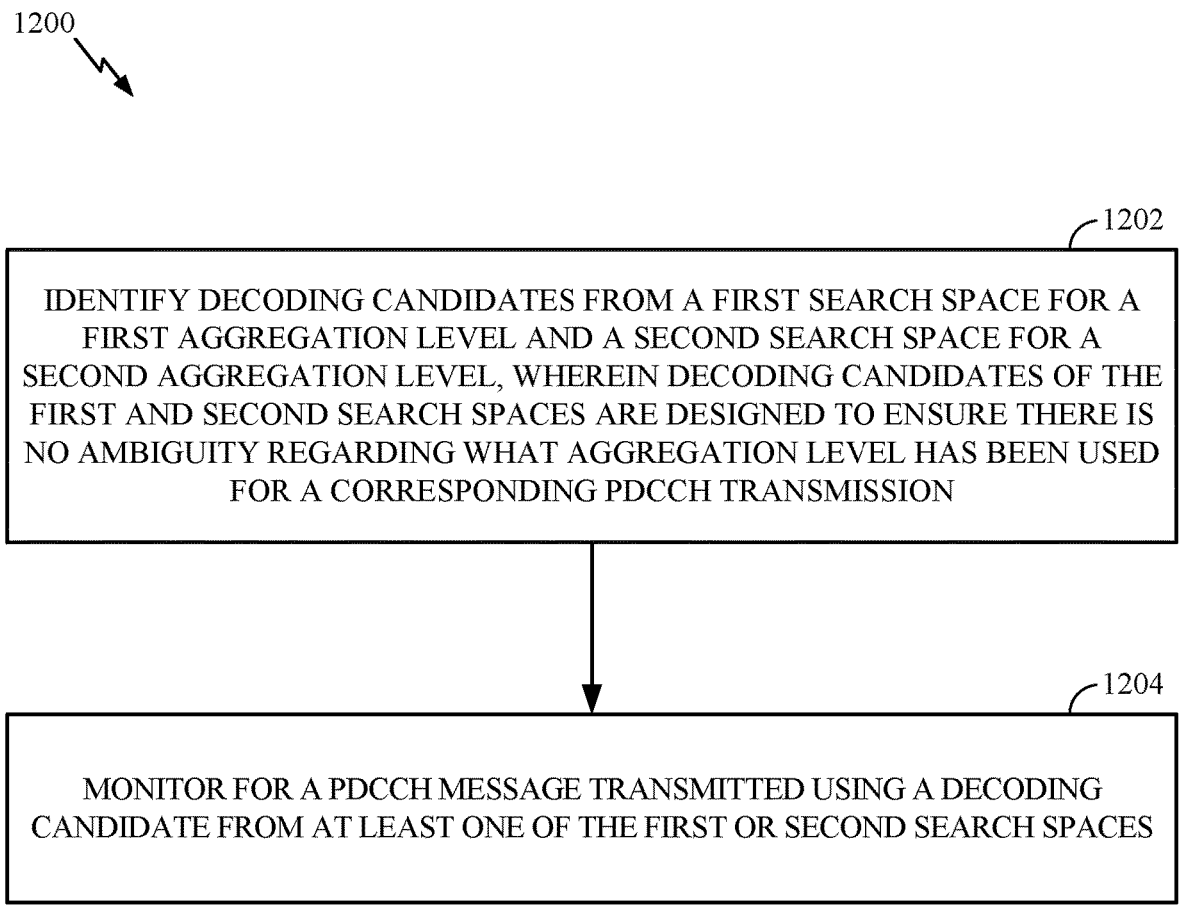
FIG. 12 illustrates example operations for wireless communications performed by a user equipment, in accordance with certain aspects of the present disclosure.

FIG. 12 illustrates example operations 1200 for wireless communications, in accordance with aspects of the present disclosure. Operations 1200 may be performed, for example, by a user equipment (e.g., UE), such as UE 120 shown in FIG. 1.

Operations 1200 begin, at 1202, where the UE identifies decoding candidates from a first search space for a first aggregation level (e.g., AL-16) and a second search space for a second aggregation level (e.g., AL-8). The decoding candidates of the first and second search spaces are designed to ensure there is no ambiguity regarding what aggregation level has been used for a corresponding PDCCH (e.g., NR-PDCCH) transmission. At 1204, the UE monitors for a PDCCH message transmitted using a decoding candidate from at least one of the first or second search spaces.

In some aspects, the gNB may forbid the search space pattern where the first N/2 CCEs in an AL-N search option is a valid AL-N/2 search option. That is, for an AL-16 NR-PDCCH, the gNB may forbid the first 8 CCEs being a valid decoding candidate for AL-8. Thus, referring to FIG. 11, each decoding candidate of the first aggregation level may span N CCEs, each decoding candidate of the second aggregation level may span N/2 CCEs, and the decoding candidates of the first aggregation may be designed to ensure that the first N/2 CCEs do not constitute a valid decoding candidate of the second aggregation level.

Figure 13:
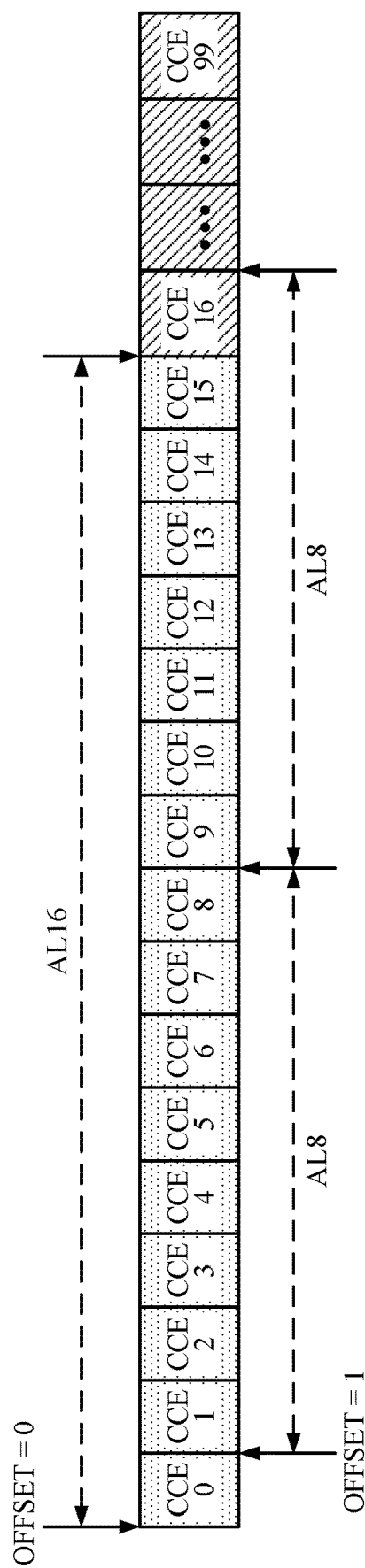
FIG. 13 illustrates an example of a base station adding an offset between search spaces of different aggregation levels, in accordance with certain aspects of the present disclosure.

In some aspects, the gNB may add an offset between the search spaces of different ALs to prevent an ambiguity regarding what aggregation level has been used for a corresponding PDCCH transmission. For example, as shown in FIG. 13, the gNB may assign the UE a first CCE offset (e.g. offset=0) to determine valid decoding candidates of the first aggregation level (e.g., AL-16) and a second CCE offset (e.g., offset=1) to determine valid decoding candidates of the second aggregation level (e.g., AL-8).

Figure 14:
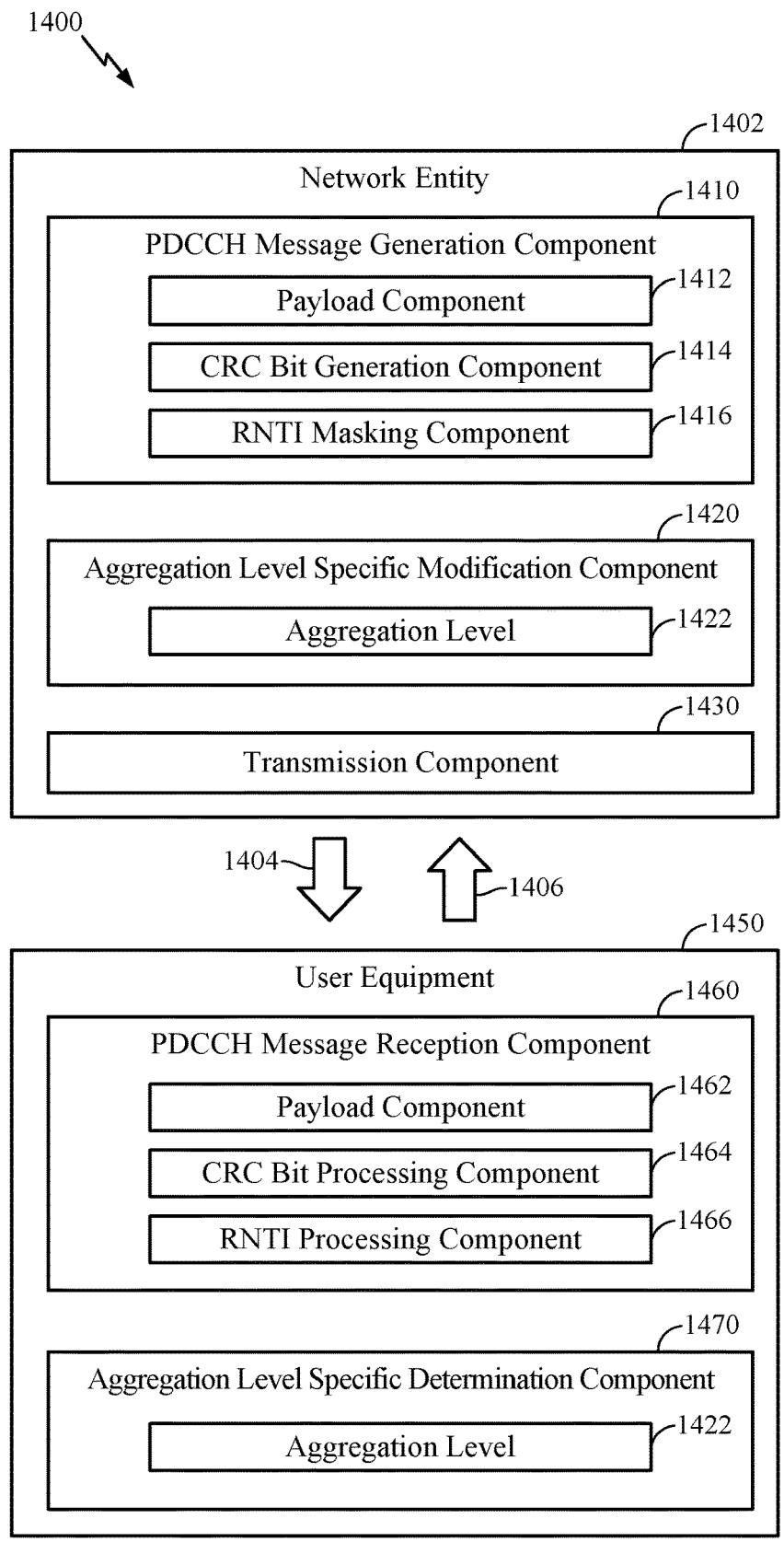
FIG. 14 is a block diagram conceptually illustrating a design of an example network entity and UE, in accordance with certain aspects of the present disclosure.

As described above, techniques presented herein may help resolve ambiguity regarding an aggregation level for a PDCCH transmission. FIG. 14 illustrates an example wireless communications system 1400 in which the techniques presented herein may be practiced. As illustrated, system 1400 includes a network entity 1402 and a UE 1450. Network entity 1402 may be a base station (e.g., a gNB), such as BS 110 shown in FIG. 1. UE 1450 may a UE be such as UE 120 shown in FIG. 1.

Network entity 1402 may include PDCCH message generation component 1410, aggregation level specific modification component 1420, and transmission component 1430. PDCCH message generation component 1410 may include payload component 1412, CRC bits generation component 1414, and RNTI masking component 1416. In operation, PDCCH message generation component 1420 may facilitate generation of a message for communication on a PDCCH. The message may include a payload, obtained by payload component 1412, and CRC bits. The CRC bits may be generated based on the payload and obtained from CRC bit generation component 1414. Further, network entity 1402 may indicate which UE 1450 a message is intended for RNTI masking component 1416, masking the CRC bits with a RNTI specific mask.

As noted above with reference to FIG. 8, in some instances, ambiguity may arise when a higher aggregation level control message can be decoded by the UE as a lower aggregation level control message. Ambiguity may also arise when the lower AL control message is decoded as a higher AL control message (although this scenario may be less likely). Aggregation level specific modification component 1420 may modify the message, and/or to attributes associated with the message generated by PDCCH message generation component 1410 based on the aggregation level 1422. For example, aggregation level specific modification component 1420 may modify attributes associated with the DCI payload, the CRC bits, and/or the RNTI based mask.

For example, the RNTI and the aggregation level 1422 may be used mask the CRC. In another example, the CRC bits may be initialized with the aggregation level 1422. In such an example, the CRC bits following the aggregation level 1422 may be all ones. In still another example, the aggregation level 1422 may be appended and/or prepended to the payload prior to generation of the CRC bits. In yet another example, at least a portion of the CRC bits may be flipped and/or masked with all ones when an aggregation level 1422 value that may cause ambiguity is used (e.g., AL=16).

DCI payload component 1412 may Include a DCI padding bit when there is possible ambiguity in the aggregation level 1422 (e.g., when the aggregation level is 16). In such an example, the DCI padding bit may be located so that it is decoded first when taking into account distributive CRC interleaving performed by PDCCH message generation component 1410. In another such example, the DCI padding bit may be located in a least reliable location taking into account distributive CRC interleaving performed by PDCCH message generation component 1410. In another example, PDCCH message generation component 1410 may use a different initialization value for a pseudo-random sequence used for scrambling the PDCCH message. By using a different initial value, a UE 1460 may be able to infer the aggregation level being used. In other words, if the different initialization value is used, the UE 1460 can infer that the aggregation level 1422 is a predefined agreed upon value (e.g., 8 or 16). In still another example, PDCCH message generation component 1410 may use an indicator bit to prompt the UE 1460 to rate match PDSCH around the CCEs used for PDCCH. In such an example, when the indicator bit is enabled, if the UE 1460 were to incorrectly decide the aggregation level, the UE 1460 performance would degrade (e.g., proper PDSCH decoding would be affected). As such, in an example aspect, when the indictor bit is enabled, the UE 1460 can assume that the aggregation level 1422 is a predefined agreed upon value (e.g., 16 or 8). In such an aspect, based on what the predefined agreed upon value was, the PDCCH message generation component 1410 would rate-match accordingly when generating the PDCCH message.

In another example, the RNTI and the aggregation level 1422 may be used mask the CRC. In another example, the CRC bits may be initialized with the aggregation level 1422. In such an example, the CRC bits following the aggregation level 1422 may be all ones. In still another example, the aggregation level 1422 may be appended and/or prepended to the payload prior to generation of the CRC bits. In yet another example, at least a portion of the CRC bits may be flipped and/or masked with all ones when an aggregation level 1422 value that may cause ambiguity is used (e.g., AL=16). In an aspect, the aggregation level 1422 may be a 4-bit value assuming the aggregation level value is used (e.g., 1, 2, 3, . . . 16). In another aspect, the aggregation level 1422 may be a 3-bit value assuming a mask is used for aggregation level value (e.g., 1, 2, 4, 8, and 16). In still another aspect, the aggregation level 1422 may be a 1-bit value assuming only aggregation level value that may cause ambiguity are used (e.g., 8 or 16).

It is noted that the above described example processes may be triggered when there is the potential for aggregation level ambiguity. Additionally, or in the alternative, the above described example processes may be irrespective of whether there is the potential for aggregation level ambiguity.

Once PDCCH message generation component generates the message, transmission component 1430 may transmit the message. In an aspect, the message may be transmitted on the downlink 1404 using PDCCH. Further network entity may receive uplink 1406 messages from UE 1450.

UE 1450 may include PDCCH message reception component 1460 and aggregation level specific determination component 1470. PDCCH message reception component 1460 may include payload component 1462, CRC bit processing component 1464, and RNTI processing component 1466. In operation, UE 1450 may receive message on the downlink 1404 on PDCCH. PDCCH message reception component 1460 may determine if at least a portion of the message is intended for the UE 1450. The message may be indicated to be intended for UE 1450 based on a RNTI value assigned to the UE 1450. Further, CRC bits appended to the payload of the message may be used to assure that the message was successfully received. Processing of the payload, CRC bits, and the RNTI may be performed by payload component 1462, CRC bit processing component 1464, and RNTI processing component 1466 respectively.

Additionally, as noted above with reference to FIG. 8, in some instances, ambiguity may arise when a higher aggregation level 1422 control message can be decoded by the UE 1450 as a lower aggregation level 1422 control message (or when the lower AL control message is decoded as a higher AL control message). Aggregation level specific processing component 1480 may process the message, and/or to attributes associated with the message based on the aggregation level 1422. In other words, based on which approach the network entity 1402 used to modify the message in an aggregation level specific manner, aggregation level specific processing component 1480 may determine the aggregation level 1422 and resolve any ambiguity that may be present with the received message.

Figure 15:
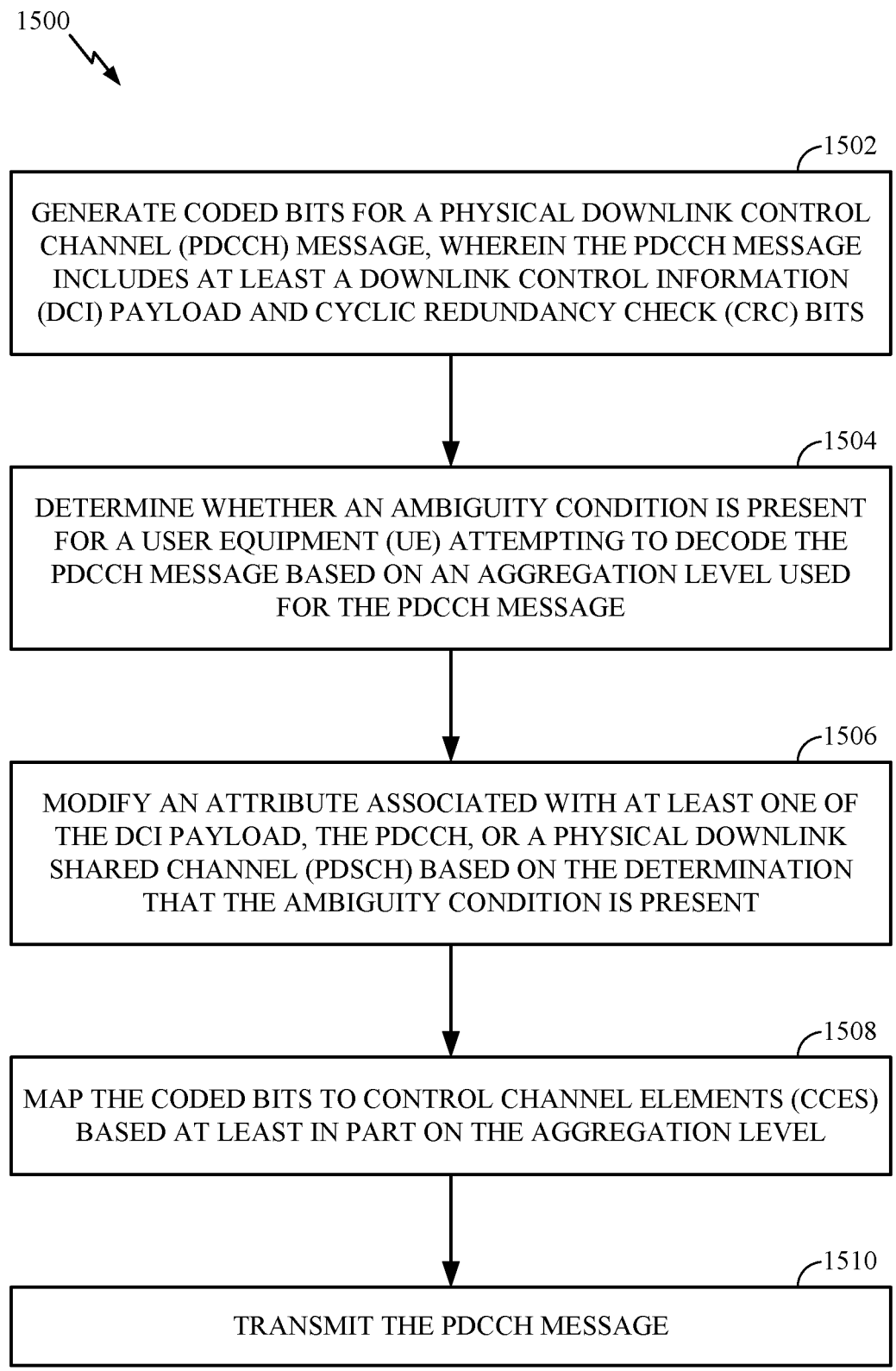
FIG. 15 illustrates example operations for wireless communications performed by a base station, in accordance with certain aspects of the present disclosure.

FIG. 15 illustrates example operations 1500 for wireless communications, in accordance with aspects of the present disclosure. Operations 1500 may be performed a base station, for example, by a base station (e.g., a gNB), such as BS 110 shown in FIG. 1, or network entity 1402 shown in FIG. 14.

At 1502, the base station may generate coded bits for a PDCCH message. In an aspect, the PDCCH message may include a DCI payload and CRC bits. In an operational aspect, PDCCH message generation component 1410 within network entity 1402 may be configured to generate the coded bits for the PDCCH message.

At 1504, the base station determines whether an ambiguity condition is present for a user equipment (UE) attempting to decode the PDCCH message based on an aggregation level used for the PDCCH message. In an operational aspect, PDCCH message generation component 1410 within network entity 1402 may be configured to determine whether aggregation level ambiguity may arise. In an aspect, an aggregation level ambiguity may arise with polar codes where an AL16 message is generated through a repetition of an AL8 message.

At 1506, the base station modifies an attribute associated with at least one of the DCI payload, the PDCCH, or a physical downlink shared channel (PDSCH) based on the determination that the ambiguity condition is present. In an aspect, the base station may add a DCI padding bit to a specific location associated with the DCI payload based on the aggregation level. In an aspect, the DCI padding bit may be used to remove the determined possible ambiguity. In such an aspect, the specific location may be selected to be a location that is decoded first or is decoded comparatively earlier than a remaining portion of the PDCCH message. In another aspect, the specific location may be selected to be a location that is a least reliable bit location. In another aspect, the base station may initialize the CRC bits with an attribute associated with the aggregation level. In an aspect where an indicator bit is enabled to indicate to rate match PDSCH around the CCEs used for PDCCH, the base station may use the enabled indicator bit to further indicate the aggregation level. In other words, when the indictor bit is enabled, it is implied that the aggregation level is a predefined value (e.g., 8, 16, etc.)

At 1508, the base station maps the coded bits to CCEs based at least in part on the aggregation level. In an operational aspect, PDCCH message generation component 1410 within network entity 1402 may be configured to map the coded bits to CCEs.

At 1510, the base station transmits the PDCCH message. In an operational aspect, transmission component 1430 may be configured to transmit the PDCCH message.

Figure 16:
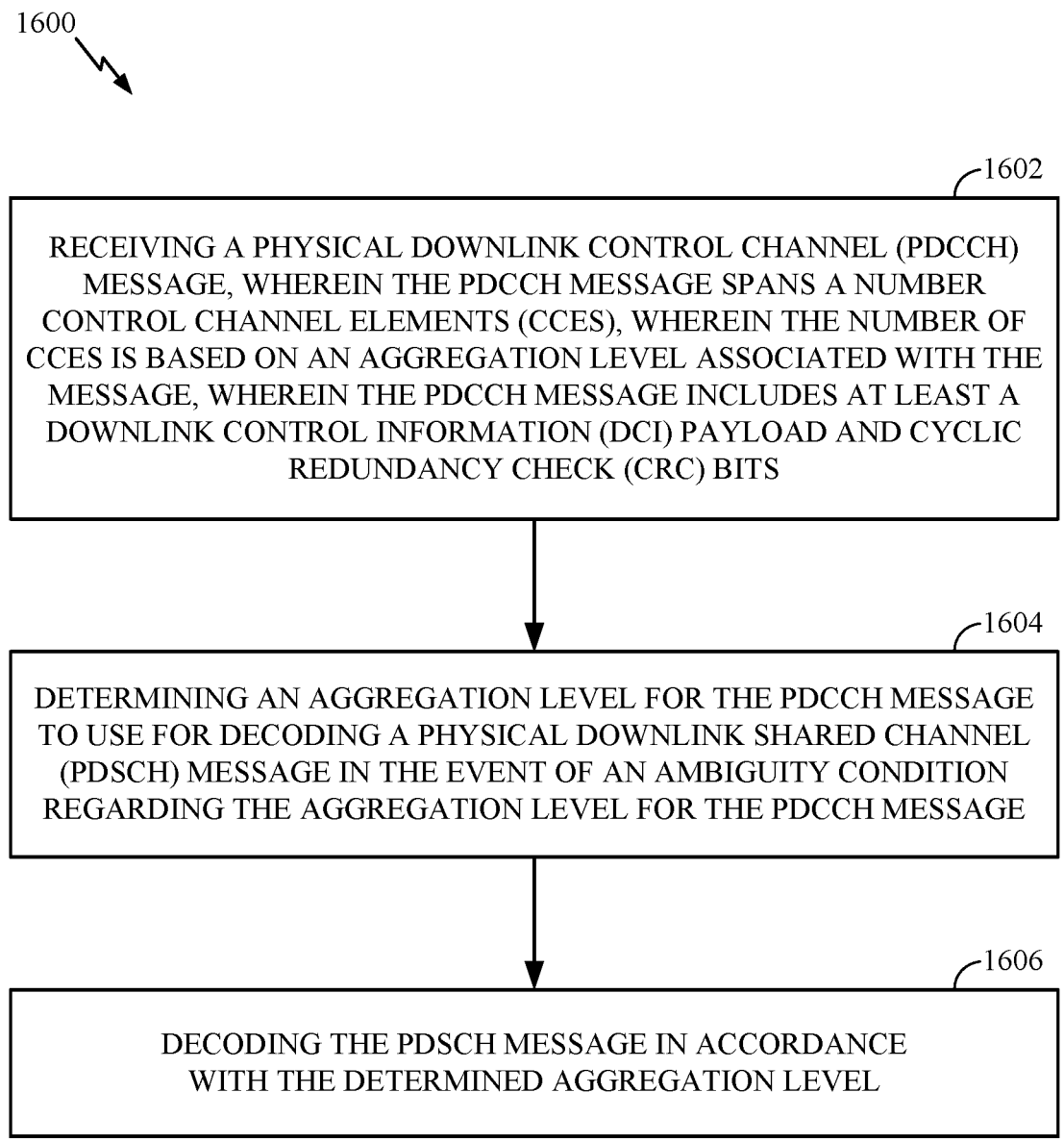
FIG. 16 illustrates example operations for wireless communications performed by a user equipment, in accordance with certain aspects of the present disclosure.

FIG. 16 illustrates example operations 1600 for wireless communications, in accordance with aspects of the present disclosure. Operations 1600 may be performed, for example, by a user equipment (e.g., UE), such as UE 120 shown in FIG. 1, or UE 1450 shown in FIG. 14.

At 1602, the UE receives a physical downlink control channel (PDCCH) message, wherein the PDCCH message spans a number control channel elements (CCEs), wherein the number of CCEs is based on an aggregation level associated with the message, wherein the PDCCH message includes at least a downlink control information (DCI) payload and cyclic redundancy check (CRC) bits. Further, in an optional aspect, the CRC bits may have been masked using at least a RNTI associated with the UE. In an operational aspect, PDCCH message reception component 1460 may be configured to receive the PDCCH message.

At 1604, the UE determines an aggregation level for the PDCCH message to use for decoding a physical downlink shared channel (PDSCH) message in the event of an ambiguity condition regarding the aggregation level for the PDCCH message. In an aspect, an attribute may be used to remove possible ambiguity associated with the aggregation level. Example are provided above with reference to FIG. 15. In an operational aspect, aggregation level specific determination component 1480 may be configured to derive the aggregation level.

At 1606, the UE decodes the PDSCH message in accordance with the determined aggregation level. In an operational aspect, PDCCH message reception component 1460 may be configured decode the PDCCH message.

Figure 17:
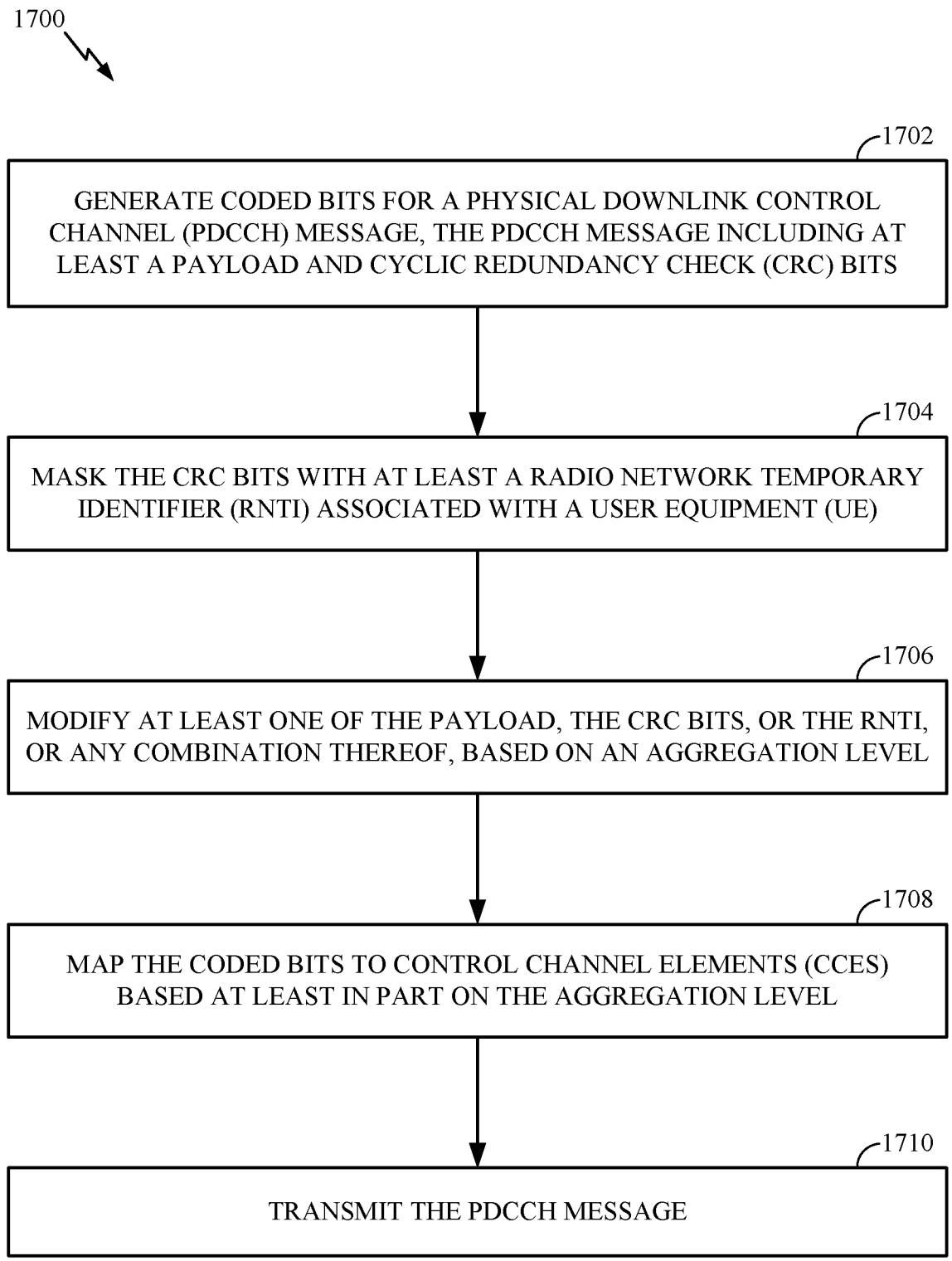
FIG. 17 illustrates example operations for wireless communications performed by a base station, in accordance with certain aspects of the present disclosure.

FIG. 17 illustrates example operations 1700 for wireless communications, in accordance with aspects of the present disclosure. Operations 1700 may be performed a base station, for example, by a base station (e.g., a gNB), such as BS 110 shown in FIG. 1, or network entity 1402 shown in FIG. 14.

At 1702, the base station may generate coded bits for a PDCCH message. In an aspect, the PDCCH message may include a payload and CRC bits. In an operational aspect, PDCCH message generation component 1410 within network entity 1402 may be configured to generate the coded bits for the PDCCH message.

At 1704, the base station masks the CRC bits with at least a RNTI associated with a UE to which the PDCCH message is intended. In an operational aspect, RNTI masking component 1416 within network entity 1402 may be configured to mask the CRC bits with the RNTI. As is noted below, the CRC bits may be masked with more than just the RNTI. For example, an aggregation level value may be used along with the RNTI to mask the CRC bits.

At 1706, the base station modifies one or more values associated with the PDCCH message in an aggregation level specific manner. For example, the base station may modify values associated with the payload, the CRC bits, the RNTI masking, etc. In an aspect, the base station may generate a masking value based on the RNTI and an attribute associated with the aggregation level and then mask the CRC bits with the new aggregation level specific masking value. In another aspect, the base station may initialize the CRC bits with an attribute associated with the aggregation level. In such an aspect, the remaining CRC bits may be set as ones. In still another aspect, the base station may add an attribute associated with the aggregation level to the payload, prior to generating CRC bits. As such, the CRC bits generated from the modified payload will be aggregation level specific. In another aspect, at least a portion of the CRC bits may be flipped and/or masked with all ones when an attribute associated with the aggregation level that may cause ambiguity is used (e.g., AL=16). Such flipping may be performed by flipping a last bit in an encoder input when polar coding is used. In an aspect, the attribute associated with the aggregation level may be a 4-bit value when the aggregation level itself is used as the value (e.g., 1, 2, 3, . . . 16). In another aspect, the attribute associated with the aggregation level may be a 3-bit value when a mask is used to note allowable aggregation levels (e.g., 1, 2, 4, 8, and 16). In still another aspect, the attribute associated with the aggregation level may be a 1-bit value when only aggregation level values that may cause ambiguity are used (e.g., 8 or 16). In an aspect, aggregation level specific modification component 920 may be configured to modify one or more values associated with the PDCCH message in an aggregation level specific manner.

At 1708, the base station maps the coded bits to CCEs based at least in part on the aggregation level. In an operational aspect, PDCCH message generation component 1410 within network entity 1402 may be configured to map the coded bits to CCEs.

At 1710, the base station transmits the PDCCH message. In an operational aspect, transmission component 1430 may be configured to transmit the PDCCH message.

Figure 18:
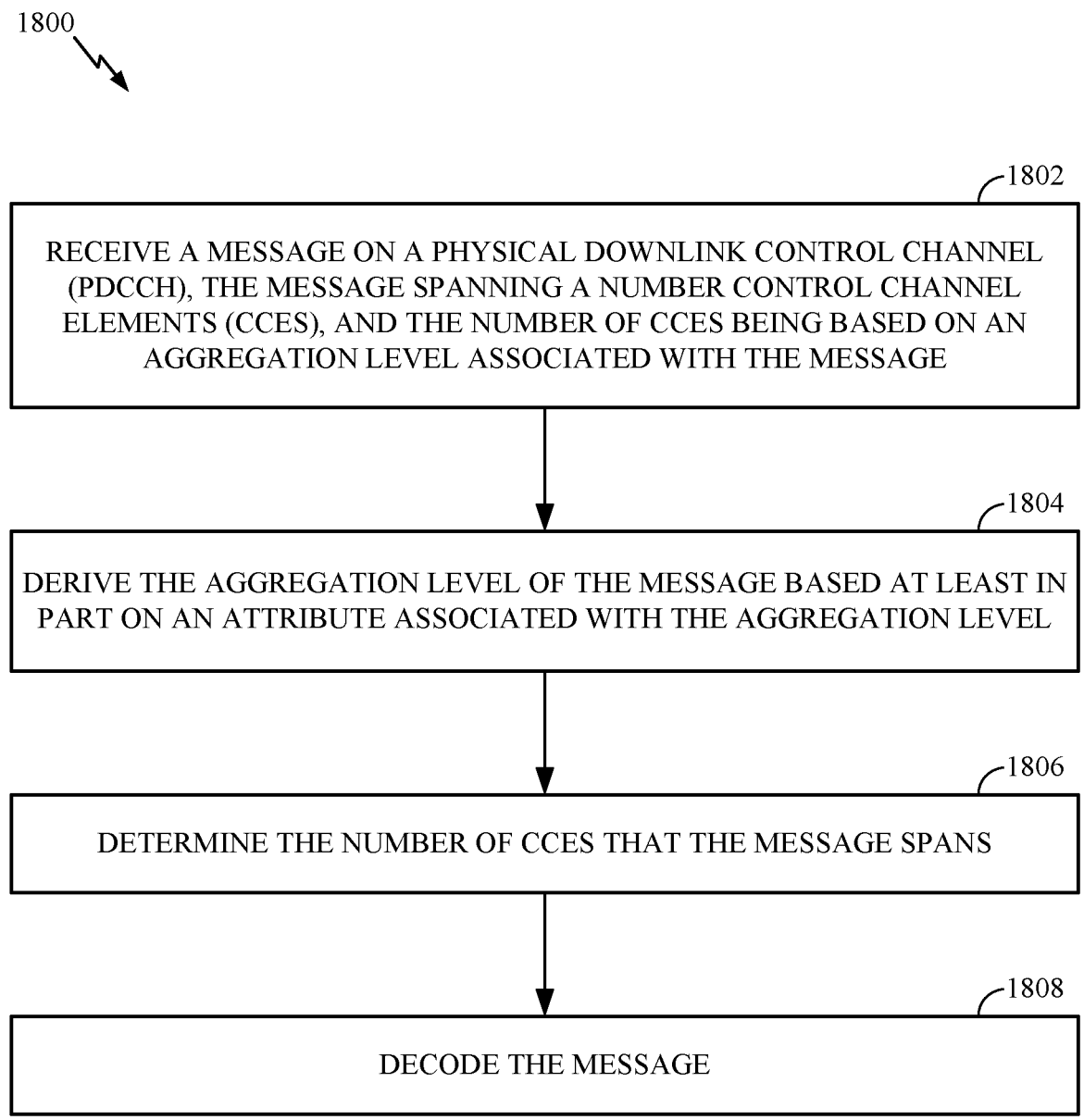
FIG. 18 illustrates example operations for wireless communications performed by a user equipment, in accordance with certain aspects of the present disclosure.

FIG. 18 illustrates example operations 1800 for wireless communications, in accordance with aspects of the present disclosure. Operations 1800 may be performed, for example, by a user equipment (e.g., UE), such as UE 120 shown in FIG. 1, or UE 1450 shown in FIG. 14.

At 1802, the UE receive a message on a PDCCH. In an aspect. The message may span a number CCEs, the number of CCEs may be based on an aggregation level associated with the message, and the message may include at least a payload and CRC bits. Further, the CRC bits may have been masked using at least a RNTI associated with the UE. In an operational aspect, PDCCH message reception component 1460 may be configured to receive the PDCCH message.

At 1804, the UE derives the aggregation level of the message based at least in part on an attribute associated with the aggregation level. In an aspect, an attribute associated with the aggregation level was used to modify the payload, the CRC bits, the RNTI, etc. For example, the CRC bits may have been masked using the RNTI and the attribute associated with the aggregation level. In another example, the CRC bits may have been initiated using the attribute associated with the aggregation level. In still another example, CRC bits may be aggregation level specific CRC bits, where an attribute associated with the aggregation level was added to the payload prior to generation of the CRC bits. In an operational aspect, aggregation level specific determination component 980 may be configured to derive the aggregation level.

At 1806, the UE determines the number of CCEs that the message spans. In an operational aspect, PDCCH message reception component 1460 may be configured determine the number of CCEs.

At 1808, the UE decodes the portion of the PDCCH message that intended for the UE. In an operational aspect, PDCCH message reception component 1460 may be configured decode the PDCCH message.

The methods described herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items may be employed by itself, or any combination of two or more of the listed items may be employed. For example, if a composition is described as containing components A, B, and/or C, the composition may contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing described herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may include one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for determining, means for generating, means for multiplexing, and/or means for applying may include one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may include a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer.

In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may include a single instruction, or many instructions, and may be distributed over several different code segments, among different programs, and across multiple storage media. The computer-readable media may include a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may include non-transitory computer-readable media (e.g., tangible media). In addition, for other aspects computer-readable media may include transitory computer-readable media (e.g., a signal). Combinations of the above should also be included within the scope of computer-readable media.

Thus, certain aspects may include a computer program product for performing the operations presented herein. For example, such a computer program product may include a computer-readable medium having instructions stored (and/or encoded) thereon, the instructions being executable by one or more processors to perform the operations described herein. For example, the instructions may include instructions for performing the operations described herein and illustrated in FIGS. 9-12 and 15-18.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving a physical downlink control channel (PDCCH) message transmitted using a decoding candidate for a first aggregation level comprising time and frequency resources that overlap with time and frequency resources of a decoding candidate for a second aggregation level; and
   decoding the PDCCH message in an aggregation level specific manner to confirm whether the PDCCH message was transmitted using the first or second aggregation level, wherein decoding the PDCCH message in an aggregation level specific manner comprises modifying one or more decoded bits in an aggregation level specific manner after de-mapping one or more coded bits from control channel elements (CCEs) of the decoding candidate for the first aggregation level, wherein modifying one or more decoded bits in an aggregation level specific manner comprises cyclically rotating the decoded bits, wherein an amount of the cyclic rotation is dependent on the first aggregation level.

2. The method of claim 1, further comprising decoding a physical downlink shared channel (PDSCH) message based on a selected one of the first or second aggregation level.

3. The method of claim 2, wherein decoding the PDSCH message comprises rate matching around CCEs used for PDCCH based on the selected aggregation level.

4. A method for wireless communications by a user equipment (UE), comprising:
receiving a physical downlink control channel (PDCCH) message transmitted using a decoding candidate for a first aggregation level comprising time and frequency resources that overlap with time and frequency resources of a decoding candidate for a second aggregation level; and
decoding the PDCCH message in an aggregation level specific manner to confirm whether the PDCCH message was transmitted using the first or second aggregation level, wherein decoding the PDCCH message in an aggregation level specific manner comprises modifying one or more decoded bits in an aggregation level specific manner after de-mapping one or more coded bits from control channel elements (CCEs) of the decoding candidate for the first aggregation level, wherein modifying one or more decoded bits in an aggregation level specific manner comprises inverting one or more of the decoded bits, depending on the first aggregation level.

5. A method for wireless communications by a network entity, comprising:
generating coded bits for a physical downlink control channel (PDCCH) message for transmission at a first aggregation level, wherein the coded bits of the PDCCH message are generated in an aggregation level specific manner, wherein generating the coded bits in an aggregation level specific manner comprises modifying one or more of the coded bits in an aggregation level specific manner before mapping the coded bits to control channel elements (CCEs) of a decoding candidate for the first aggregation level, and wherein modifying one or more of the coded bits in an aggregation level specific manner comprises cyclically rotating the coded bits before mapping to control channel elements (CCEs) of the decoding candidate for the first aggregation level, wherein an amount of the cyclic rotation is dependent on the first aggregation level; and
transmitting the PDCCH message to a user equipment (UE) using the decoding candidate for the first aggregation level comprising time and frequency resources that overlap with time and frequency resources of a decoding candidate for a second aggregation level.

6. The method of claim 5, further comprising transmitting a physical downlink shared channel (PDSCH) message based on a selected one of the first or second aggregation level.

7. The method of claim 6, wherein transmitting the PDSCH message comprises rate matching around CCEs used for PDCCH based on the selected aggregation level.

8. A method for wireless communications by a network entity, comprising:
generating coded bits for a physical downlink control channel (PDCCH) message for transmission at a first aggregation level, wherein the coded bits of the PDCCH message are generated in an aggregation level specific manner, wherein generating the coded bits in an aggregation level specific manner comprises modifying one or more of the coded bits in an aggregation level specific manner before mapping the coded bits to control channel elements (CCEs) of a decoding candidate for the first aggregation level, and wherein modifying one or more of the coded bits in an aggregation level specific manner comprises inverting one or more of the coded bits, depending on the first aggregation level; and
transmitting the PDCCH message to a user equipment (UE) using the decoding candidate for the first aggregation level comprising time and frequency resources that overlap with time and frequency resources of a decoding candidate for a second aggregation level.

\* \* \* \* \*